United States Patent
Aoki et al.

(10) Patent No.: US 7,208,102 B2
(45) Date of Patent: Apr. 24, 2007

(54) PLASMA DISPLAY UNIT, PHOSPHOR AND PROCESS FOR PRODUCING PHOSPHOR

(75) Inventors: Masaki Aoki, Osaka (JP); Hiroyuki Kawamura, Osaka (JP); Kazuhiko Sugimoto, Kyoto (JP); Mitsuhiro Otani, Osaka (JP); Junichi Hibino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 264 days.

(21) Appl. No.: 10/485,305

(22) PCT Filed: May 15, 2003

(86) PCT No.: PCT/JP03/06049

§ 371 (c)(1),
(2), (4) Date: Jan. 30, 2004

(87) PCT Pub. No.: WO03/097769
PCT Pub. Date: Nov. 27, 2003

(65) Prior Publication Data
US 2004/0183439 A1 Sep. 23, 2004

(30) Foreign Application Priority Data
May 17, 2002 (JP) .............................. 2002-142663

(51) Int. Cl.
*H01J 11/02* (2006.01)
*C09K 11/64* (2006.01)
(52) U.S. Cl. ............................ 252/301.4 R; 313/582; 313/584
(58) Field of Classification Search .................. None
See application file for complete search history.

(56) References Cited

U.S. PATENT DOCUMENTS 5,611,959 A 3/1997 Kijima et al.
6,617,788 B2 * 9/2003 Shiiki et al. ................. 313/582

FOREIGN PATENT DOCUMENTS

JP 4-270782 9/1992
JP 2001-55567 2/2001

OTHER PUBLICATIONS

"Phosphor Handbook", p. 219-220, published from Ohm Co., Ltd. on Dec. 25, 1987 with partial translation.
N. Kijima, "Crystal Structure and Degradation Mechanism of Blue Phosphor", Display and Imaging, 1999, vol. 7, pp. 225-234.
Hajime Yamamoto, "Phosphors For Next-Generation Display Devices", Applied Physics, vol. 70, No. 3 (2001), pp. 309-312 with partial translation.
M. Shiiki et al., "Thermal degradation of PDP phosphors", Technical Report of IEICE. EID99-94 (Jan. 2001), pp. 117-122.

* cited by examiner

Primary Examiner—C. Melissa Koslow
(74) Attorney, Agent, or Firm—Wenderoth, Lind & Ponack, L.L.P.

(57) ABSTRACT

A plasma display device exhibits suppressed luminance degradation of a phosphor, a suppressed change in chromaticity and improved discharge characteristics as a result of suppression of adsorption of water or hydrocarbon-containing gas on a surface of a blue phosphor. A blue phosphor layer used in the plasma display device is formed of a compound expressed by $Ba_{1-x}MgAl_{10}O_{17}:Eu_x$ or $Ba_{1-x-y}Sr_yMgAl_{10}O_{17}:Eu_x$ and includes at least one element that is selected from Nb, Ta, Pr, P, As, Sb, Bi and Tm which substitutes for a part of its Al or Mg element.

18 Claims, 5 Drawing Sheets

PLASMA DISPLAY UNIT, PHOSPHOR AND PROCESS FOR PRODUCING PHOSPHOR

TECHNICAL FIELD

The present invention relates to a plasma display device used as, for example, a television for image display and also relates to a phosphor and a method of manufacturing the phosphor.

BACKGROUND ART

Of color display devices used as, for example, computers and televisions for image display, a display device using a plasma display panel (hereinafter referred to as "PDP") has received attention in recent years as a large-size, thin and lightweight color display device.

A plasma display device using this PDP produces a display in full color by additive mixture of so-called three primary colors (red, green and blue). For display in full color, the plasma display device is provided with phosphor layers which emit respective lights having these respective three primary colors, that is, red (R), green (G) and blue (B). Phosphor particles of each phosphor layer are excited by ultraviolet rays generated in a discharge cell of the PDP, thereby producing visible colored light.

Known compounds used for the above-described phosphors having the respective colors include $(YGd)BO_3:Eu^{3+}$ which emits red light, $Zn_2SiO_4:Mn^{2+}$ which emits green light and $BaMgAl_{10}O_{17}:Eu^{2+}$ which emits blue light. Each of these phosphors is made by mixing specified raw materials and then firing a resulting mixture at a high temperature of at least 1,000° C. for solid-phase reaction (refer to, for example, "Phosphor Handbook" published by Ohmsha, Ltd., pp. 219 and 220). Phosphor particles obtained by this firing are ground and sifted before use (so that red and green phosphor particles have a mean particle diameter of 2 μm to 5 μm, while blue phosphor particles have a mean particle diameter of 3 μm to 10 μm). The phosphor particles are ground and sifted (classified) for the following reason. In general, paste including the phosphor particles having each color is applied by screen printing to form a phosphor layer in the PDP. A surface of the paste applied easily becomes smoother if the particle diameters of the phosphor are smaller and more uniform (in particle size distribution). In other words, the smaller and more uniform the particle diameters of the phosphor, and the more spherical the phosphor particles, the smoother the applied surface. Accordingly, packing density and a light-emitting surface area of the phosphor particles in the phosphor layer conceivably increase, thus increasing luminance of the plasma display device.

Figure 6:
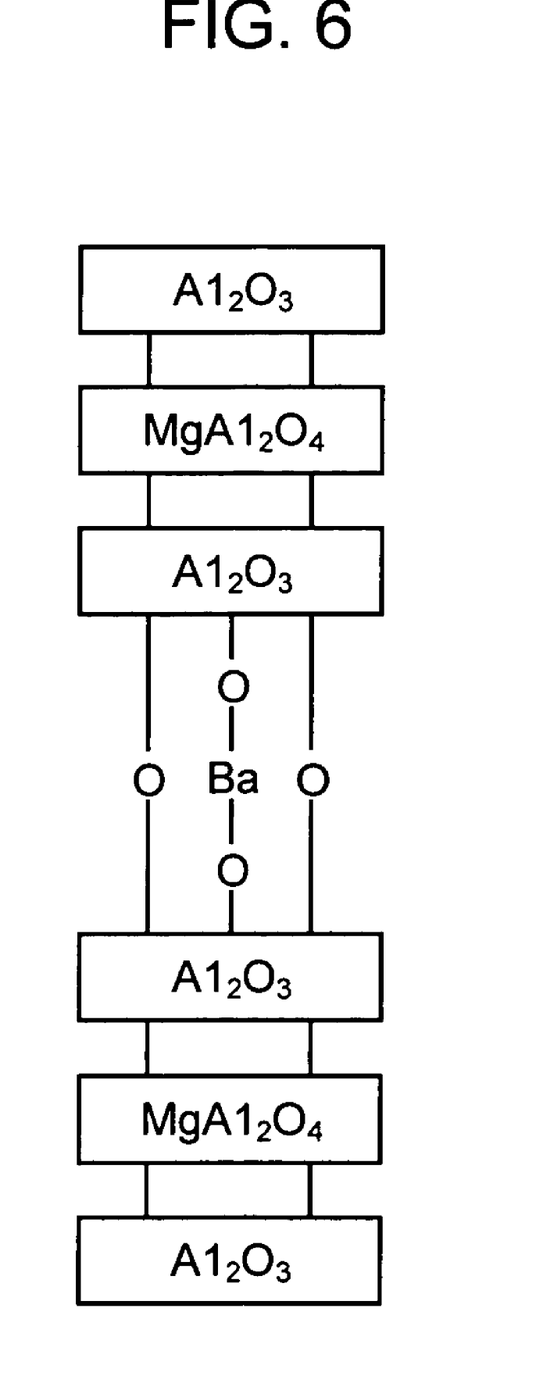
FIG. 6 is a schematic view illustrating an atomic structure of a blue phosphor in accordance with the embodiment of this invention.

However, reducing the particle diameters of the phosphor particles increases a surface area of the phosphor and thus increases a number of defects in the phosphor. For this reason, a large amount of water, carbon dioxide or hydrocarbon-containing organic substances easily adheres to a surface of the phosphor. For a blue phosphor, including a divalent Eu ion as a luminescence center, such as $Ba_{1-x}MgAl_{10}O_{17}:Eu_x$ or $Ba_{1-x-y}Sr_yMgAl_{10}O_{17}:Eu_x$, in particular, its crystal structure has a layer structure (refer to, for example, "Display and Imaging", 1999, Vol. 7, pp. 225–234). This layer structure includes an oxygen (O) vacancy in the vicinity of a layer (Ba—O layer) including a Ba atom, and the smaller the particle diameters, the more these vacancies problematically increase in number (refer to, for example, "OYO BUTSURI (Applied Physics)", Vol. 70, No. 3, 2001, p. 310). FIG. 6 schematically illustrates a structure of a Ba—O layer of the blue phosphor, $Ba_{1-x}MgAl_{10}O_{17}:Eu_x$.

For the above reason, water existing in air or hydrocarbon-containing gas selectively adsorbs on a surface of such a Ba—O layer. Such water and gas are released into the panel in large amounts in a panel manufacturing process and react with the phosphor and MgO during discharge, thus problematically degrading luminance, causing a change in chromaticity (which leads to a color shift or a burn on a screen), and reducing a drive margin and raising discharge voltage.

It is also known that the defects increase further in number as vacuum ultraviolet rays (VUV), having a wavelength of 147 nm, and which are generated by discharge in driving the panel, are absorbed, thus problematically degrading luminance of the phosphor further (refer to, for example, "Technical Report" published by the Institute of Electronics, Information and Communication Engineers, EID99–94, Jan. 27, 2000).

To solve these problems, the following conventional method (such as disclosed in Japanese Patent Unexamined Publication No. 2001-55567) is devised. According to this method, an entire surface of a phosphor is covered with a crystal coating of $Al_2O_3$ for a purpose of repairing a vacancy in the vicinity of the Ba—O layer.

However, covering the entire surface of the phosphor with the crystal coating of $Al_2O_3$ causes ultraviolet rays to be absorbed, thus problematically reducing emission luminance of the phosphor.

In view of the problems discussed above, the present invention aims to suppress degradation of luminance of a phosphor or a change in chromaticity, or improve discharge characteristics by suppressing adsorption of water on the surface of the blue phosphor.

SUMMARY OF THE INVENTION

To address the problems discussed above, a plasma display device constructed according to the present invention includes a plasma display panel including a plurality of disposed discharge cells having one of one color and a respective plurality of colors, and disposed phosphor layers that have respective colors corresponding to respective discharge cells and are excited by ultraviolet rays to emit light, wherein the phosphor layers include a blue phosphor. The blue phosphor is formed of a compound expressed by one of $Ba_{1-x}MgAl_{10}O_{17}:Eu_x$ and $Ba_{1-x-y}Sr_yMgAl_{10}O_{17}:Eu_x$, and the compound includes at least one element, selected from Nb, Ta, Pr, P, As, Sb, Bi and Tm, for substituting for a part of one of an Al element and an Mg element.

In such a structure, this pentavalent element is substituted for the part of the aluminum (Al) element or magnesium (Mg) element in the blue phosphor, thus reducing oxygen vacancies in the vicinity of Ba—O layers and suppressing adsorption of water or hydrocarbon-containing gas on a surface of the blue phosphor. Consequently, degradation of luminance of a panel or a change in chromaticity is suppressed, or discharge characteristics are improved without a decrease in luminance of the phosphor.

DETAILED DESCRIPTION OF THE PREFERRED EMBODIMENTS

An exemplary embodiment of the present invention is demonstrated hereinafter with reference to the accompanying drawings.

Inventors of this invention have found that degradation of luminance is caused essentially not by existence of a defect, but selective adsorption of water, carbon dioxide or hydrocarbon-containing gas to an oxygen (O) vacancy in the vicinity of a Ba—O layer. A phosphor reacts with adsorbing water or hydrocarbons under irradiation with ultraviolet rays or ions, thus causing luminance degradation or a color shift. In other words, the inventors have come to know that various degradations are caused by adsorption of water, carbon dioxide or hydrocarbon-containing gas to an oxygen vacancy in the vicinity of a Ba—O layer in a blue phosphor.

Based on such knowledge, degradations, which occur when a panel is manufactured and driven, have been prevented by reducing oxygen vacancies in the vicinity of Ba—O layers of the blue phosphor without a decrease in luminance of the blue phosphor. The oxygen vacancies in the vicinity of the Ba—O layers could be reduced by substituting a pentavalent element for a part of an aluminum (Al) element or a magnesium (Mg) element of a blue phosphor having a crystal structure, such as $BaMgAl_{10}O_{17}$:Eu or $BaSrMgAl_{10}O_{17}$:Eu.

A description is provided hereinafter of an advantage of substitution of the pentavalent ion for the part of the Al or Mg element in $BaMgAl_{10}O_{17}$.

In the blue phosphor, $BaMgAl_{10}O_{17}$:Eu, Al and Mg are present as trivalent and divalent positive ions, respectively. Substituting praseodymium (Pr), thulium (Tm) or a pentavalent positive ion, such as niobium (Nb), tantalum (Ta), phosphorus (P), arsenic (As), antimony (Sb), or bismuth (Bi), for Al or Mg increases a number of positive charges in a crystal. To neutralize or compensate for this positive charge, oxygen carrying a negative charge fills an oxygen vacancy in the vicinity of a Ba element. As a result, the oxygen vacancies in the vicinity of the Ba—O layers can conceivably be reduced.

A description is provided hereinafter of methods of manufacturing a phosphor of a plasma display device of the present invention.

Conceivable methods of manufacturing the phosphor include a solid-phase reaction method using a material, such as an oxide, a nitrate or a carboxide, and flux, a liquid phase method of heat-treating a precursor of the phosphor that is made by hydrolyzing organometallic salts or nitrates in an aqueous solution or made by a co-precipitation method of adding an alkali or the like for precipitation, and a liquid spray method of spraying an aqueous solution including phosphor materials into a heated furnace. Even when the phosphor is made by any of these methods, the substitution of Pr, Tm or the pentavalent ion (Nb, Ta, P. As; Sb, or Bi) for the part of the Al or Mg element in $BaMgAl_{10}O_{17}$:Eu has been discovered to be effective.

A description is provided now of preparation of the blue phosphor by the solid-phase reaction method. Materials including carbonates, such as $BaCO_3$ and $MgCO_3$, and oxides, such as $Al_2O_3$, $Eu_2O_3$ and $M_2O_5$ (where M is Nb, Ta, P, As, Sb, or Bi) are mixed with a small amount of flux ($AlF_3$ or $BaCl_2$), which is a sintering accelerator. A resulting mixture is fired at 1,400° C. for about 2 hours and then ground and sifted. Next, the mixture ground and sifted is fired at 1,500° C. for about 2 hours in a reducing atmosphere (including 5% of $H_2$ and $N_2$) and thereafter ground and sifted again, thus forming the phosphor.

Firing this phosphor further in an oxidizing atmosphere is effective in preventing luminance degradation or generation of a defect in the phosphor that is caused by vacuum ultraviolet rays (VUV) during discharge (driving).

Preparation of the phosphor by the liquid phase method is as follows. Organometallic salts (e.g. alkoxides or acetylacetone) or nitrates that include elements forming the phosphor are dissolved in water for hydrolysis, thus forming a co-precipitate (hydrate). Next, the hydrate is subjected to hydrothermal synthesis in an autoclave for crystallization, firing in air or sprayed into a high-temperature furnace, thus forming fine phosphor particles. The fine phosphor particles are fired at 1,500° C. in a reducing atmosphere (including 5% of $H_2$ and $N_2$) and then ground and sifted.

It is desirable that the Pr, Tm or pentavalent ion (Nb, Ta, P, As, Sb, or Bi) in an amount of 0.01% to 3% be substituted for Al or Mg. A substitution amount of less than 0.01% is less effective in preventing luminance degradation, and a substitution amount of more than 3% results in reduced luminance of the phosphor. The above-described Pr, Tm or pentavalent ion is substituted for the Al or Mg ion, not the Ba or Eu ion because it has been confirmed that the blue phosphor has a wavelength of 450 nm in an emission spectrum regardless of an amount of substitution.

The amount of substitution of the Pr, Tm or pentavalent element (Nb, Ta, P, As, Sb, or Bi) for the Al or Mg element is as follows. When $Ba(Mg_{1-a}Ma)(Al_{1-b}Mb)_{10}O_{17}$:$Eu_x$, it is preferable that $0.0001 \leq a \leq 0.03$, and $0.0001 \leq b \leq 0.03$. In other words, the substitution amount preferably ranges from 0.01% to 3% inclusive.

The blue phosphor thus made has small particle diameters ranging from 0.05 µm to 3 µm and has a favorable particle size distribution. If the phosphor particles forming a phosphor layer are spherical in shape, packing density increases further, thus substantially increasing a light-emitting area of the phosphor particles that contributes to light emission. Accordingly, luminance of a plasma display device increases, and consequently, the plasma display device obtained can have excellent luminance characteristics with luminance degradation and a color shift suppressed.

It is more preferable that the phosphor particles have a mean particle diameter of 0.1 µm to 2.0 µm. Also, it is more preferable that the particle size distribution is such that a maximum particle diameter is at most four times a mean particle diameter, while a minimum particle diameter is at least one quarter of the mean particle diameter. Ultraviolet rays reach to a depth as shallow as hundreds of nanometers from a surface of phosphor particles, and substantially only the surface of the phosphor particles emits light. With phosphor particles having diameters up to 2.0 µm, a surface area of the particles that contributes to light emission increases, so that a phosphor layer maintains high luminous efficiency. With particle diameters not less than 3.0 μm, the phosphor layer needs to have a thickness of at least 20 μm, so that enough discharge space cannot be secured. With particle diameters not more than 0.1 μm, a defect is prone to occur, so that luminance does not improve. If a thickness of the phosphor layer is 8 to 25 times the mean particle diameter of the phosphor particles, enough discharge space can be secured, while the phosphor layer maintains high luminous efficiency.

Concrete phosphor particles used for the blue phosphor layer in the plasma display device of the present invention use a compound expressed by $Ba_{1-x}MgAl_{10}O_{17}:Eu_x$ or $Ba_{1-x-y}Sr_yMgAl_{10}O_{17}:Eu_x$. When values X and Y in the compound are such that $0.03 \leq X \leq 0.20$ and $0.1 \leq Y \leq 0.5$, luminance increases further, which situation is preferable.

Concrete phosphor particles used for a red phosphor layer in the plasma display device of this invention use a compound expressed by $Y_{2-x}O_3:Eu_X$ or $(Y,Gd)_{2-x}BO_3:Eu_X$. When value X in the compound is such that $0.05 \leq X \leq 0.20$, the red phosphor exhibits excellent luminance and resistance to degradation of luminance, which situation is preferable.

Concrete phosphor particles used for a red phosphor layer in the plasma display device of this invention use a compound expressed by $Y_{2-x}O_3:Eu_X$ or $(Y,Gd)_{1-x}BO_3:Eu_X$. When value X in the compound is such that $0.05 \times 0.20$, the red phosphor exhibits excellent luminance and resistance to degradation of luminance, which situation is preferable.

Referring to the accompanying drawings, a description is provided hereinafter of the plasma display device (PDP) in accordance with the exemplary embodiment of the present invention.

Figure 1:
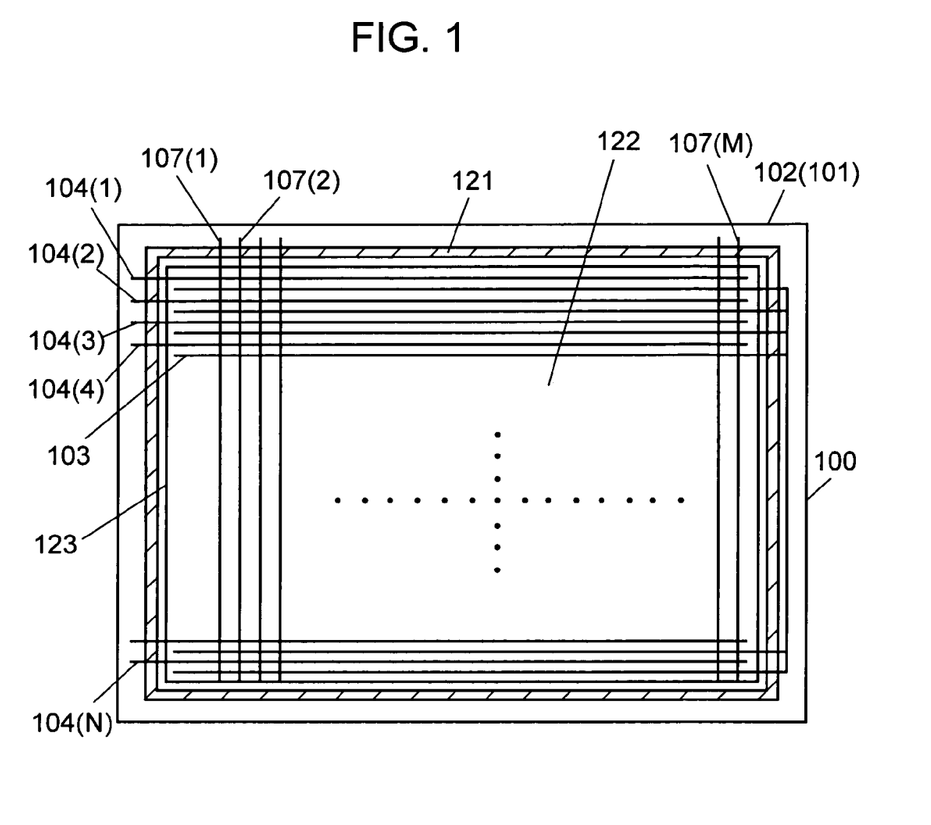
FIG. 1 is a plan view of a PDP in accordance with an exemplary embodiment of the present invention, schematically illustrating an arrangement of electrodes of the PDP.
Figure 2:
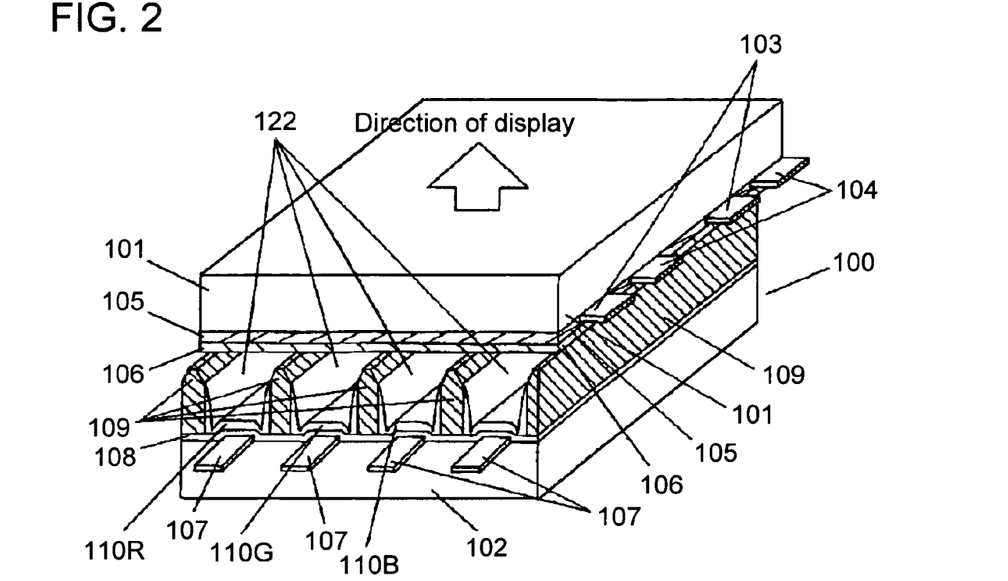
FIG. 2 is a sectional view in perspective, illustrating a structure of an image display region of the PDP in accordance with the embodiment of this invention.

FIG. 1 is a plan view of the PDP, schematically illustrating an arrangement of electrodes, and FIG. 2 is a perspective view illustrating an image display region of the PDP. In FIG. 1, numbers of display electrodes, display scan electrodes and address electrodes are reduced to facilitate description.

As shown in FIG. 1, PDP 100 includes front glass substrate 101 (not shown), rear glass substrate 102, N display electrodes 103, N display scan electrodes 104 (the Nth electrode is denoted by N), M address electrodes 107 (the Mth electrode is denoted by M) and hermetically sealing layer 121 designated by a shaded part. This PDP 100 has an electrode matrix having a three-electrode structure including electrodes 103, 104, 107. Cells are formed where address electrodes 107 intersect display electrodes 103 and display scan electrodes 104. Image display region 123 is formed inwardly of hermetically sealing layer 121

Figure 3:
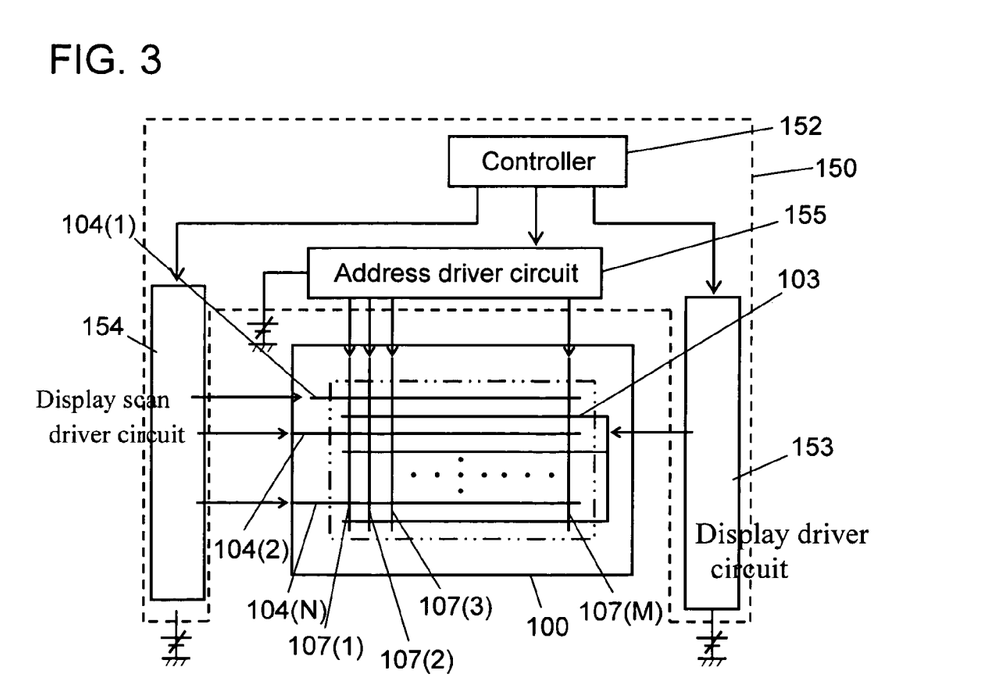
FIG. 3 is a drive block diagram of a plasma display device in accordance with the embodiment of this invention.

As shown in FIG. 2, PDP 100 is constructed as follows. A front panel, which includes display electrodes 103, display scan electrodes 104, dielectric glass layer 105 and MgO protective layer 106 disposed above a principal surface of its front glass substrate 101, and a rear panel, which includes address electrodes 107, dielectric glass layer 108, barrier ribs 109 and phosphor layers 110R, 110G, 110B disposed above a principal surface of its rear glass substrate 102, are put together, and discharge spaces 122 formed between the front and rear panels are filled with discharge gas. FIG. 3 is a block diagram illustrating structure of the plasma display device including a driving circuit 150.

As shown in FIG. 3, PDP 100 is provided with display driver circuit 153, display scan driver circuit 154 and address driver circuit 155. Under control of controller 152, a voltage is applied to display scan electrode 104 and address electrode 107 of a cell to be illuminated for address discharge between these electrodes 104, 107. Thereafter, a pulse voltage is applied between display electrode 103 and display scan electrode 104 for sustain discharge, from which ultraviolet rays are generated in the above-mentioned cell. Phosphor layer 110 excited by the ultraviolet rays emits light, thus illuminating the cell. An image is displayed by a combination of illuminated and unilluminated cells having respective colors.

Figure 4:
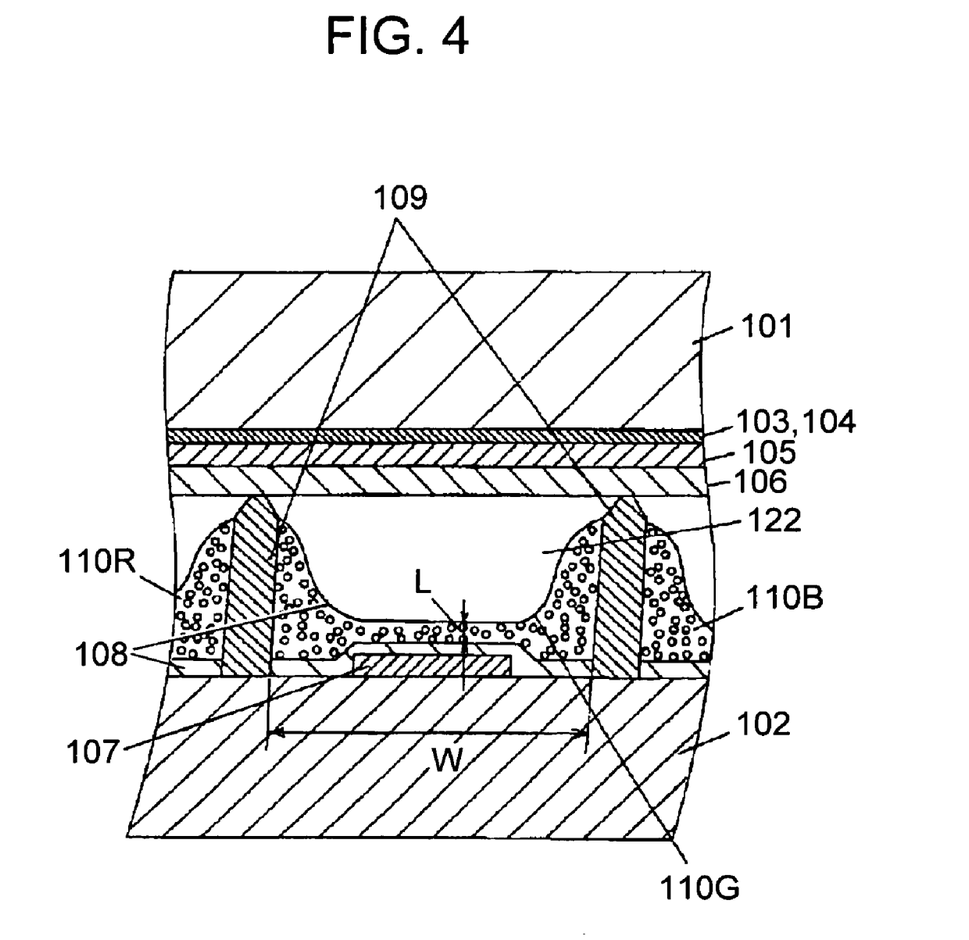
FIG. 4 is a sectional view illustrating the structure of the image display region of the PDP in accordance with the embodiment of this invention.
Figure 5:
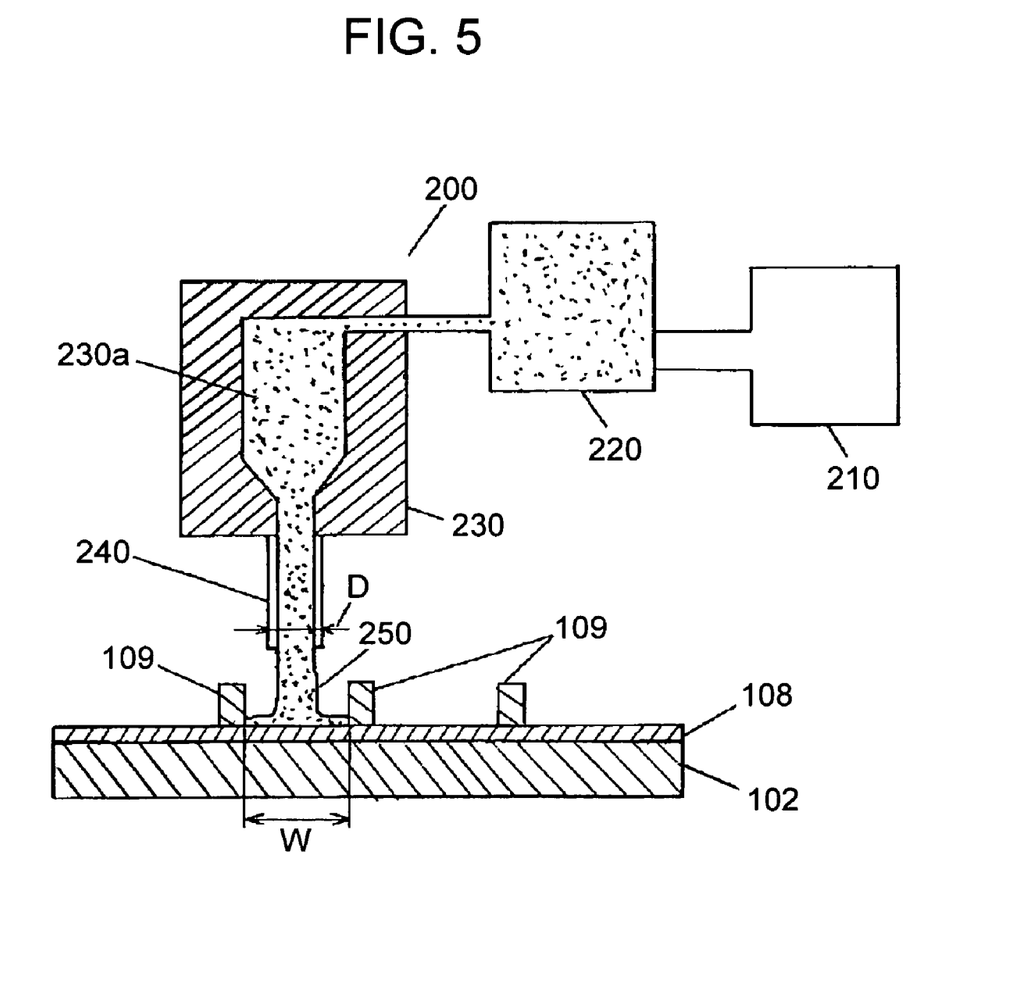
FIG. 5 is a schematic diagram illustrating a structure of an ink applying device used in forming a phosphor layer of the PDP in accordance with the embodiment of this invention.

Referring to FIGS. 4 and 5, a description is provided next of a method of manufacturing the above-mentioned PDP. FIG. 4 is a sectional view of the PDP, and FIG. 5 is a sectional view of a phosphor ink applying device.

The front panel is formed in the following manner. First, N display electrodes 103 and N display scan electrodes 104 (FIG. 2 shows only two electrodes 103 and two electrodes 104) are alternately formed in a parallel relation like stripes on front glass substrate 101. Subsequently, these electrodes 103, 104 are covered with dielectric glass layer 105, which is then covered with MgO protective layer 106.

Display electrode 103 and display scan electrode 104 are each formed of a transparent electrode made of ITO and a bus electrode made of silver, and are formed by firing subsequent to application of silver paste for bus electrodes through screen printing.

Dielectric glass layer 105 is formed to have a specified thickness (approximately 20 μm) by applying paste including lead glass material through screen printing and then firing the paste at a specified temperature (e.g. 560° C.) for a specified period of time (e.g. 20 minutes). Examples of the paste including the lead glass material for use include a mixture of PbO (70 wt %), $B_2O_3$ (15 wt %), $SiO_2$ (10 wt %), $Al_2O_3$ (5 wt %), and an organic binder made by dissolving 10% of ethyl cellulose in α-terpineol. The organic binder mentioned here includes resin dissolved in an organic solvent. Instead of ethyl cellulose, acrylic resin can be used as the resin, and butyl carbitol or the like can be used as the organic solvent. Further, a dispersant such as glyceryl-triloleate may be mixed into such an organic binder.

MgO protective layer 106 is made of magnesium oxide (MgO) and is formed by, for example, sputtering or chemical vapor deposition (CVD) to have a specified thickness (about 0.5 μm).

The rear panel is formed in the following manner. First, M address electrodes 107 are formed in rows by applying silver paste for these electrodes to rear glass substrate 102 through screen printing or photolithography, and then firing the paste. Subsequently, dielectric glass layer 108 is formed on these electrodes 107 by applying paste including lead glass material through screen printing. Thereafter, barrier ribs 109 are formed by repeatedly applying the same paste including the lead glass material to dielectric glass layer 108 at specified pitches through screen printing and then firing the paste. These barrier ribs 109 partition discharge space 122 into cells (unit light-emitting regions) along rows.

FIG. 4 is a partial sectional view of PDP 100. As shown in FIG. 4, interval W between barrier ribs 109 is conditioned to range from about 130 μm to 240 μm in accordance with an HDTV having a diagonal screen of 32 inches to 50 inches. The red (R), green (G) and blue (B) phosphors are each applied to a groove between barrier ribs 109. In the blue (B) phosphor, $Ba_{1-X}MgAl_{10}O_{17}:Eu_X$ or $Ba_{1-x-y}Sr_yMgAl_{10}O_{17}:Eu_X$, the pentavalent element is substituted for part of the Al or Mg element. Paste-like phosphor ink including each of these phosphors and an organic binder is applied and fired at a temperature of 400° C. to 590° C., whereby the organic binder is burned out. In this way, phosphor layers 110R, 110G, 110B each having phosphor particles bound are formed. It is desirable that thickness L of each of these phosphor layers 110R, 110G, 110B along a direction of lamination is about 8 to 25 times a mean particle diameter of the phosphor particles above address electrode 107. In other words, it is desirable that each phosphor layer has such a thickness that the phosphor particles are stacked to form at least 8 layers, preferably about 20 layers. This is because, instead of permitting passage of ultraviolet rays, the phosphor layer needs to absorb ultraviolet rays generated in discharge space 122 for ensuring luminance (luminous efficiency) when irradiated with a certain amount of ultraviolet rays. With a greater thickness, the luminous efficiency of phosphor layers 110R, 110G, 110B becomes almost saturated. With a thickness exceeding the thickness of about 20 layers, a sufficiently large discharge space 122 cannot be secured. Even when numbers of layers stacked are the same, phosphor particles having sufficiently small particle diameters and spherical shapes, like those obtained by hydrothermal synthesis or the like are packed more densely in a phosphor layer and have a larger total surface area than particles which are not spherical in shape. For this reason, these phosphor particles increase a surface area contributing to actual light emission of the phosphor layer, thus increasing the luminous efficiency. Synthesis methods for these phosphor layers 110R, 110G, 110B, and a method of manufacturing blue phosphor particles including trivalent Eu ions substituting for 15% to 75% of divalent Eu ions for use in a blue phosphor layer are described later.

The front and rear panels thus made are placed one on top of the other with address electrodes 107 of the rear panel orthogonal to electrodes 103, 104 of the front panel. Sealing glass is disposed along a periphery of the panels and fired, for example, at 450° C. for 10 to 20 minutes to form hermetically sealing layer 121 (see FIG. 1) for sealing. Subsequently, discharge space 122 is once exhausted of air to a high vacuum (e.g. $1.1 \times 10^{-4}$ Pa) and then filled with a discharge gas (e.g. He—Xe or Ne—Xe inert gas) at a specified pressure, thus completing PDP 100.

FIG. 5 is a schematic diagram illustrating a structure of the ink coating apparatus used in forming the phosphor layer. As shown in FIG. 5, ink coating apparatus 200 includes server 210, pressurizing pump 220 and header 230. By being pressurized by pressurizing pump 220, phosphor ink is supplied from server 210, which stores the phosphor ink, to header 230. Header 230 has ink chamber 230a and nozzle 240 (having an inside diameter of 30 μm to 120 μm). The phosphor ink supplied to ink chamber 230a by pressurization is discharged continuously from nozzle 240. It is desirable that bore diameter D of nozzle 240 be at least 30 μm to prevent the nozzle from clogging up and at most interval W (ranging from about 130 μm to 240 μm) between barrier ribs 109 for preventing the applied ink from extending over the barrier ribs. Typically, bore diameter D is set at 30 μm to 130 μm.

Header 230 is constructed to be driven linearly by a header scanning mechanism (not shown). Allowing header 230 to scan with nozzle 240 discharging phosphor ink 250 continuously allows the phosphor ink to be applied uniformly to a groove between barrier ribs 109 over rear glass substrate 102. The phosphor ink used here has a viscosity maintained within in a range of 1,500 to 30,000 centipoises (CP) at 25° C.

Server 210 is provided with a stirring apparatus (not shown), which prevents precipitation of particles in the phosphor ink by stirring the ink. Header 230 is integrally formed to include ink chamber 230a and nozzle 240 and is made by performing machining and electric discharge machining on metallic material.

The method of forming the phosphor layers is not limited to the method described above. Other various kinds of methods usable include photolithography, screen printing and a method of disposing a film including phosphor particles mixed therein.

Phosphor particles having each color, binder and an organic solvent are mixed to form the 1,500- to 30,000-centipoise (CP) phosphor ink. On an as needed basis, a surface active agent, silica, a dispersant (0.1 to 5 wt %) or the like may be added.

Ethyl cellulose or acrylic resin can be used as the binder included in the phosphor ink (to account for 0.1 to 10 wt % of the ink), and α-terpineol or butyl carbitol can be used as the solvent. A polymer, such as PMA or PVA, can also be used as the binder, and an organic solvent, such as diethylene glycol or methyl ether, can also be used as the solvent.

EMBODIED EXAMPLES

A description is provided hereinafter of synthesis methods for respective phosphors used in the present embodiment.

First, a description is provided of the blue phosphor, $Ba_{1-x}MgAl_{10}O_{17}:Eu_X$, synthesized by hydrothermal synthesis.

In a process of preparing a mixed solution, materials including barium nitrate ($Ba(NO_3)_2$), magnesium nitrate ($Mg(NO_3)_2$), aluminum nitrate ($Al(NO_3)_3$) and europium ($Eu(NO_3)_2$) are mixed in a molar ratio of 1−X:1:10:X (where $0.03 \leq X \leq 0.2$) and dissolved in an aqueous medium, whereby a hydrated mixed solution is made. As the aqueous medium, ion-exchange water or pure water is preferable because either of these waters contains no impurities. However, the aqueous medium can be used even when a non-aqueous solution, such as methanol or ethanol, is also included.

As a material for substituting Pr, Tm or a pentavalent ion (Nb, Ta, P, As, Sb, or Bi) for Mg or Al, a nitrate, a chloride or an organic compound that includes the above-mentioned Pr, Tm or pentavalent ion is used. An amount of substitution is as follows. When $(Mg_{1-a}Ma)(Al_{1-b}Mb)$ (where M is the Pr, Tm or pentavalent ion), material is mixed so that $0.0001 \leq a \leq 0.03$, and $0.0001 \leq b \leq 0.03$.

Next, this hydrated mixed solution is poured into a container made of corrosion- and heat-resistant material, such as gold or platinum, and then undergoes hydrothermal synthesis in a device capable of heating and pressurizing simultaneously, such as an autoclave, for 12 to 20 hours at a specified temperature (100° C. to 350° C.) under a specified pressure (0.2 MPa to 25 MPa), thus forming fine phosphor particles.

Subsequently, the particles are fired in a reducing atmosphere (including, for example, 5% of hydrogen and 95% of nitrogen) at a specified temperature (e.g. 1,350° C. to 1,600° C.) for a specified period of time (e.g. 2 hours) and then classified. Consequently, a desired blue phosphor, $Ba_{1-x}MgAl_{10}O_{17}:Eu_X$, including the Pr, Tm or pentavalent ion substituting for the part of Mg or Al can be obtained. To increase resistance to vacuum ultraviolet rays (VUV), this phosphor may be fired in an oxidizing atmosphere (at a temperature of preferably 700° C. to 1,000° C.).

The phosphor particles obtained by such hydrothermal synthesis are spherical in shape and have particle diameters smaller than those of particles made by a conventional solid-phase reaction method (with a mean particle diameter of about 0.05 μm to 2.0 μm). The term "spherical" used here is defined because most of the phosphor particles have aspect ratios (minor axis diameter/major axis diameter) ranging, for example, between 0.9 and 1.0 inclusive. However, not all the phosphor particles need to have aspect ratios falling within this range.

The blue phosphor can be obtained even when the hydrated mixed solution prepared in the above-mentioned mixed solution preparation process is sprayed from a nozzle into a high-temperature furnace.

A description is provided next of the blue phosphor, $Ba_{1-x-y}Sr_yMgAl_{10}O_{17}:Eu_x$, made by a solid-phase reaction.

Materials including barium hydroxide $(Ba(OH)_2)$, strontium hydroxide $(Sr(OH)_2)$, magnesium hydroxide $(Mg(OH)_2)$, aluminum hydroxide $(Al(OH)_3)$ and europium hydroxide $(Eu(OH)_2)$ undergo weighing so that a required molar ratio is obtained. Next, an oxide or a hydroxide that includes Pr, Tm or a pentavalent ion (Nb, Ta, P, As, Sb, or Bi) which substitutes for Mg or Al undergoes weighing so that a required ratio is obtained. These materials are mixed with flux, $AlF_3$. A resulting mixture is fired at a specified temperature (1,300° C. to 1,400° C.) for a specified period of time (12 to 20 hours), whereby $Ba_{1-x-y}Sr_yMgAl_{10}O_{17}:Eu_x$ including the Pr, Tm or pentavalent ion substituting for Mg or Al can be obtained.

Next, this $Ba_{1-x-y}Sr_yMgAl_{10}O_{17}:Eu_x$ is fired in a reducing atmosphere (including, for example, 5% of hydrogen and 95% of nitrogen) at a specified temperature (1,000° C. to 1,600° C.) for 2 hours and thereafter classified, whereby a phosphor can be obtained. Materials used for the phosphor mainly include an oxide, nitrate and hydroxide. However, an organometallic compound, including an element such as Ba, Sr, Mg, Al, Eu, Nb, Ta, Pr, P, As, Sb, Bi or Tm, such as a metal alkoxide or acetylacetone, can be used for forming the phosphor. If the above-mentioned reduced phosphor is annealed in an oxidizing atmosphere, a resulting phosphor degrades less from VUV.

A description is provided next of the green phosphor, $Zn_{2-x}SiO_4:Mn_x$.

In a first process of preparing a mixed solution, materials including zinc nitrate $(Zn(NO_3)_2)$, silicon nitrate $(Si(NO_3)_4)$ and manganese nitrate $(Mn(NO_3)_2)$ are mixed in a molar ratio of $2-X:1:X$ (where $0.01 \times 0.10$). Next, this mixed solution is sprayed from a nozzle into a high-temperature furnace heated to 1,500° C. with ultrasonic waves applied. In this way, the green phosphor is made.

A description is provided next of the green phosphor, $Ba_{1-x}Al_{12}O_{17}:Mn_x$.

In a first process of preparing a mixed solution, materials including barium nitrate $(Ba(NO_3)_2)$, aluminum nitrate $(Al(NO_3)_3)$ and manganese nitrate $(Mn(NO_3)_2)$ are mixed in a molar ratio of $1-X:12:X$ (where $0.01 \times 0.10$) and then dissolved in ion-exchange water, whereby a mixed solution is made. In a hydration process, a basic aqueous solution (e.g. aqueous ammonia solution) is dropped into this mixed solution, whereby a hydrate is made. In a hydrothermal synthesis process, this hydrate and ion-exchange water are poured into a capsule made of corrosion- and heat-resistant material, such as platinum or gold and then undergo hydrothermal synthesis in a high-pressure vessel such as an autoclave at a specified temperature (e.g. 100° C. to 300° C.) under a specified pressure (e.g. 0.2 MPa to 10 MPa) for a specified period of time (e.g. 2 to 20 hours). Thereafter, drying is performed, whereby desired $Ba_{1-x}Al_{12}O_{19}:Mn_x$ is obtained. A phosphor obtained by this hydrothermal synthesis process has particle diameters of about 0.1 μm to 2.0 μm and are spherical in shape. Next, these fine particles are annealed in air at a temperature of 800° C. to 1,100° C. and then classified, whereby the green phosphor is obtained.

A description is provided next of the red phosphor, $(Y,Gd)_{1-x}BO_3:Eu_x$.

In a process of preparing a mixed solution, materials including yttrium nitrate $(Y(NO_3)_3)$, gadolinium $(Gd(NO_3)_3)$, boric acid $(H_3BO_3)$ and europium nitrate $(Eu(NO_3)_3)$ are mixed in a molar ratio of $(Y(NO_3)_3+Gd(NO_3)_3):H_3BO_3:Eu(NO_3)_3=1-X:2:X$ (where $0.05 \times 0.20$, and Y-to-Gd ratio is 65:35).

Next, this mixed solution is heat-treated in air at a temperature of 1,200° C. to 1,350° C. for 2 hours and then classified, whereby the red phosphor is obtained.

A description is provided next of the red phosphor, $Y_{2-x}O_3:Eu_x$. In a process of preparing a mixed solution, materials including yttorium nitrate $(Y(NO_3)_3)$ and europium nitrate $(Eu(NO_3)_3)$ are mixed in a molar ratio of $2-X:X$ (where $0.05 \times 0.30$) and then dissolved in ion-exchange water, whereby a mixed solution is made. In a hydration process, a basic aqueous solution (e.g. aqueous ammonia solution) is added to this mixed solution, whereby a hydrate is made. In a hydrothermal synthesis process, this hydrate and ion-exchange water are poured into a container made of corrosion- and heat-resistant material such as platinum or gold, and then undergo hydrothermal synthesis in a high-pressure vessel such as an autoclave, for example, at a temperature of 100° C. to 300° C. under a pressure of 0.2 MPa to 10 MPa for 3 to 12 hours. A resulting compound is thereafter dried, whereby fine red phosphor particles are made. Next, these phosphor particles are annealed in air at a temperature of 1,300° C. to 1,400° C. for 2 hours and then classified, whereby the red phosphor is obtained. The phosphor obtained by this hydrothermal synthesis process has particle diameters of about 0.1 μm to 2.0 μm and are spherical in shape. These particle diameters and shapes are suitable for formation of a phosphor layer having excellent light-emitting characteristics.

The phosphors used for respective phosphor layers 110R, 110G of above-mentioned PDP 100 are conventional phosphors, while phosphor layer 110B uses the above-mentioned phosphor particles including the Pr, Tm or pentavalent ion substituting for the part of Mg or Al of the phosphor. For a conventional blue phosphor, degradation in each process is more severe than that of the blue phosphor of the present invention, so that color temperature of white tends to decrease when lights having these respective three colors are emitted at the same time. For this reason, a color temperature of white display has been improved by reducing luminance of cells having respective red and green phosphors through use of a circuit in a plasma display device. However, use of the above-mentioned blue phosphor increases luminance of the blue cell and reduces degradation during panel production, thus eliminating a need for intentional reduction of the luminance of the cells having the other colors. Since the luminances of all these colored cells can thus be used to their fullest extent, the luminance of the plasma display device can be increased, while the color temperature of the white display is kept high.

The blue phosphor of the present invention can find application in a fluorescent lamp where this phosphor emits light in a similar manner by being excited by ultraviolet rays. In this case, conventional blue phosphor particles to be applied to an inner wall of a fluorescent tube are replaced with a phosphor layer made of the blue phosphor including the Pr, Tm or pentavalent ion substituting for the part of Mg or Al of the phosphor. Application of the present invention to the fluorescent lamp in such a manner can afford luminance and resistance to degradation of the luminance that are more excellent than those of a conventional fluorescent lamp.

respective blue phosphors annealed in an oxidizing atmosphere (including $N_2$ and $O_2$) at 700° C., 900° C., 1,000° C., respectively, for 2 hours after synthesis.

TABLE 1

| Sample No. | Blue Phosphor ($Ba_{1-x}MgAl_{10}O_{17}:Eu_x$) | | | Red Phosphor ($(Y, Gd)_{1-x}BO_3:Eu_x$) | | Green Phosphor ($(Zn_{2-x}Mn_x)_2SiO_4$) | |
|---|---|---|---|---|---|---|---|
| | Amount (x) of Eu | Manufacturing Method | Element Substituting for Al or Mg and Amount (%) of Element | Amount (x) of Eu | Method | Amount (x) of Mn | Manufacturing Method |
| 1 | x = 0.03 | Hydrothermal Synthesis Method | Nb 0.05% | x = 0.1 | Solid-Phase Reaction Method | x = 0.01 | Spray Method |
| 2 | x = 0.05 | Solid-Phase Reaction Method (Flux Method) | Ta 0.01% | x = 0.2 | Spray Method | x = 0.02 | Hydrothermal Synthesis Method |
| 3 | x = 0.1 | Spray Method | Pr 0.03% | x = 0.3 | Aqueous Solution Method | x = 0.05 | Solid-Phase Reaction Method |
| 4 | x = 0.2 | Aqueous Solution Method and Firing at 700° C. in $N_2$—$O_2$ Atmosphere | P 3.0% | x = 0.15 | Hydrothermal Synthesis Method | x = 0.1 | Solid-Phase Reaction Method |

| Sample No. | Blue Phosphor ($Ba_{1-x-y}Sr_yMgAl_{10}O_{17}:Eu_x$) | | | Red Phosphor ($(Y_{1-x})_2O_3:Eu_x$) | | Green Phosphor ($(Ba_{1-x}Al_{12}O_{19}:Mn_x)$) | |
|---|---|---|---|---|---|---|---|
| | Amounts (x, y) of Eu and Sr | Manufacturing Method | Element Substituting for Al or Mg and Amount (%) of Element | Amount (x) of Eu | Method | Amount (x) of Mn | Manufacturing Method |
| 5 | x = 0.03 y = 0.1 | Solid-Phase Reaction Method (Flux Method) | As 1.0% | x = 0.01 | Hydrothermal Synthesis Method | x = 0.01 | Hydrothermal Synthesis Method |
| 6 | x = 0.1 y = 0.3 | Hydrothermal Synthesis Method and Firing at 900° C. in $N_2$—$O_2$ Atmosphere | Sb 0.05% | x = 0.1 | Spray Method | x = 0.02 | Spray Method |
| 7 | x = 0.1 y = 0.5 | Spray Method | Bi 0.02% | x = 0.15 | Aqueous Solution Method | x = 0.05 | Solid-Phase Reaction Method |
| 8 | x = 0.2 y = 0.3 | Solid-Phase Reaction Method and Firing at 1,000° C. in $N_2$—$O_2$ Atmosphere | Tm 1.0% | x = 0.2 | Solid-Phase Reaction Method | x = 0.1 | Solid-Phase Reaction Method |
| 9 | x = 0.2 y = 0.3 | Solid-Phase Reaction Method and Firing at 1,000° C. in $N_2$—$O_2$ Atmosphere | P 1.0% Pr 0.5% | x = 0.2 | Solid-Phase Reaction Method | x = 0.1 | Solid-Phase Reaction Method |
| 10 | x = 0.1 y = 0.5 | Solid-Phase Reaction Method and Firing at 1,000° C. in $N_2$—$O_2$ Atmosphere | P 0.5% Tm 0.1% | x = 0.15 | Aqueous Solution Method | x = 0.01 | Hydrothermal Synthesis Method |
| 11* | x = 0.1 y = 0.5 | Solid-Phase Reaction Method | No Element | x = 0.15 | Aqueous Solution Method | x = 0.01 | Hydrothermal Synthesis Method |

*Sample 11 is a comparative example.

For performance evaluation of the plasma display device of the present invention, phosphor samples based on the above-described embodiment and plasma display devices using these respective samples were made, and performance evaluation of the devices was conducted as follows.

Each plasma display device has a diagonal screen of 42 inches (which is within specifications of an HDTV having a rib pitch of 150 μm) and was made to include a 20-μm-thick dielectric glass layer, a 0.5-μm-thick MgO protective layer and a distance of 0.08 mm between a display electrode and a display scan electrode. A discharge space is filled with discharge gas, which is a gas mixture including mainly neon and 5% of xenon gas, at a specified discharge gas pressure.

Conditions of synthesis and specifications for each phosphor sample are shown in Table 1. A phosphor used as blue phosphor particles used in each of the plasma display devices corresponding to respective samples 1–10 in Table 1 includes a Pr, Tm or pentavalent ion substituting for a part of Mg or Al of the phosphor. Samples 4, 6 and 8 had their Samples 1–4 each use a combination of $(Y,Gd)_{1-X}BO_3$:$Eu_X$ (red phosphor), $Zn_{2-X}SiO_4$:$Mn_X$ (green phosphor) and $Ba_{1-x}MgAl_{10}O_{17}$:$Eu_x$ (blue phosphor). The synthesis method for the phosphor, the Pr or pentavalent ion substituting for Mg or Al, an amount of this substituted element, and substitution ratios of Eu and Mn, which become luminescence centers, that is, a substitution ratio of Eu to the Y element, a substitution ratio of Eu to the Ba element and a substitution ratio of Mn to the Zn element, are varied as shown in Table 1.

Samples 5–10 each use a combination of $Y_{2-X}O_3$:$Eu_X$ (red phosphor), $Ba_{1-X}Al_{12}O_{19}$:$Mn_X$ (green phosphor) and $Ba_{1-x-y}Sr_yMgAl_{10}O_{17}$:$Eu_x$ (blue phosphor). Similarly to the above, conditions of the synthesis method for the phosphor, the Tm or pentavalent ion substituting for Mg or Al ion of the blue phosphor, an amount of this substituted element, and substitution ratios of luminescence centers are varied as shown in Table 1.

Phosphor ink used for forming a phosphor layer in formation of a PDP uses each of these kinds of phosphor particles shown in Table 1 and was made by mixing a phosphor, resin, a solvent and a dispersant. Each phosphor ink thus made has a viscosity kept in a range of 1,500 CP to 30,000 CP at 25° C. When each phosphor layer formed was observed, the phosphor ink was applied uniformly to each wall surface of each barrier rib. The phosphor particles used for the phosphor layer having each color have a mean particle diameter of 0.1 µm to 3.0 µm and a maximum particle diameter not more than 8 µm.

Comparative sample 11 is a sample using conventional blue phosphor particles which did not undergo any specific substitution.

Experiment 1

Luminance of the blue color of each of samples 1–10 and comparative sample 11 made was measured before as well as after the phosphor was fired (at 520° C. for 20 minutes) in a process of manufacturing a rear panel, and a luminance degradation rate of the blue color was determined. Specifically, luminance of phosphor particles was measured before firing, and luminance of ink applied and fired was measured.

Experiment 2

A change of luminance of each blue phosphor, between before and after panels were put together and sealed (at 450° C. for 20 minutes), was determined in manufacture of the PDP.

Addressing failure in address discharge was determined by presence of a flicker in an image. Even one flicker is counted as an addressing failure.

Table 2 shows luminances and luminance degradation rates of each color as results of these experiments 1–3.

As shown in Table 2, comparative sample 11 using the blue phosphor not including a substituent element has a high luminance degradation rate in each step. This comparative example 11 has a 5.5% decrease in luminance after a phosphor firing step, a 21.5% decrease in luminance after a sealing step and a 35% decrease in luminance in an accelerated life test performed at 200 V and 100 kHz. Samples 1–10 each have a blue color degradation rate lower than 3% and no addressing failure.

This is because oxygen vacancies in the blue phosphor (especially oxygen vacancies in the vicinity of Ba—O layers) were reduced substantially by substitution of the Pr, Tm or pentavalent ion (Nb, Ta, P, As, Sb, or Bi) for the part of the Mg or Al element of the blue phosphor. Accordingly, water existing in an atmosphere or given off by the MgO layer, the barrier rib, sealing frit, the phosphor and others conceivably did not adsorb on defective layers (the oxygen vacancies in the vicinity of the Ba—O layers) at a surface of the phosphor in firing of the phosphor and in sealing of the panels.

Samples 4, 6 and 8, which had their respective blue phosphors annealed in an oxidizing atmosphere, had their oxygen vacancies reduced and accordingly have reduced luminance degradation rates in a test where discharge sustain pulses of 100 kHz were applied at 200 V.

TABLE 2

| Sample No. | Luminance Degradation Rate (%) of Phosphor Fired at 520° C. in Rear Panel Manufacturing Process | | | Luminance Degradation Rate (%) of Phosphor After Panels were Put Together and Sealed at 450° C. | | | Luminance Degradation Rate (%) of Phosphor After Discharge Sustain Pulses of 100 kHz were Applied at 200 V for 100 hrs | | | Addressing Failure in Address Discharge | Luminance of Blue Display over Whole Surface cd/cm² |
|---|---|---|---|---|---|---|---|---|---|---|---|
| | Blue | Red | Green | Blue | Red | Green | Blue | Red | Green | | |
| 1 | −0.3 | −1.2 | −4.9 | −2.1 | −2.6 | −13.0 | −2.0 | −4.4 | −14.5 | Absent | 83.2 |
| 2 | −0.5 | −1.3 | −4.0 | −1.9 | −2.4 | −13.2 | −2.0 | −4.1 | −14.2 | Absent | 83.5 |
| 3 | −0.2 | −1.4 | −4.5 | −2.2 | −2.3 | −12.9 | −2.2 | −4.0 | −14.6 | Absent | 85.5 |
| 4 | −0.1 | −1.4 | −4.7 | −0.4 | −2.2 | −12.7 | −0.5 | −4.2 | −14.1 | Absent | 80.4 |
| 5 | −0.2 | −1.5 | −4.9 | −2.0 | −2.0 | −12.9 | −2.1 | 4.3 | −14.8 | Absent | 88.1 |
| 6 | −0.4 | −1.2 | −4.3 | −0.6 | −2.3 | −12.6 | −0.8 | −4.1 | −14.9 | Absent | 88.5 |
| 7 | −0.4 | −1.4 | −4.5 | −1.8 | −2.4 | −12.3 | −2.0 | −4.2 | −14.7 | Absent | 89.5 |
| 8 | −0.1 | −1.2 | −4.3 | −0.4 | −2.5 | −12.5 | −0.3 | −4.3 | −15.1 | Absent | 82.5 |
| 9 | −0.3 | −1.5 | −4.1 | −1.6 | −2.1 | −12.8 | −1.8 | −4.1 | −15.6 | Absent | 90.2 |
| 10 | −0.2 | −1.3 | −4.2 | −1.5 | −2.3 | −13.0 | −1.5 | −4.1 | −14.8 | Absent | 87.5 |
| 11* | −5.5 | −1.5 | −4.1 | −21.5 | −2.1 | −13.2 | −35 | −4.1 | −15.6 | Present | 45.8 |

*Sample 11 is a comparative example.

Experiment 3

Luminance was measured before as well as after a PDP was illuminated with blue light, and a luminance degradation rate was determined. Specifically, luminance of a panel was measured before as well as after discharge sustain pulses of 100 kHz were applied to each plasma display device at 200 V for 100 straight hours, and the luminance degradation rate (<[luminance after application−luminance before the application]/the luminance before the application>*100) was determined from these measurements.

Experiment 4

In a model experiment, these samples were left in an atmosphere having a relative humidity of 90% at 60° C. for 10 minutes and then dried at 100° C. Thereafter, these samples underwent temperature-programmed desorption-gas chromatography-mass spectrometry (TDS analysis). As a result, a water physisorption peak (around 100° C.) and a water chemisorption peak (300° C. to 500° C.) of sample 11 which has not undergone substitution were each ten times as high as a corresponding peak of each of samples 1–10.

Experiment 5

In Experiment 1, the blue phosphors of the present invention have been used in respective plasma display devices. A sample fluorescent lamp using the phosphor of this invention that emits light in a similar manner by being excited by ultraviolet rays in this fluorescent lamp was made. Sample fluorescent lamp 12 was made by applying a mixture, including a colored phosphor made under the conditions of sample 7 of Table 1, to an inner wall of a fluorescent tube to form a phosphor layer in a publicly known fluorescent lamp. As a comparative example, sample fluorescent lamp 13 was made by applying a mixture including the colored phosphor of sample 11 of Table 1 that was made by a conventional solid-phase reaction. Table 3 shows results.

TABLE 3

| Sample No. | Phosphor | Luminance $(cd/m^2)$ | Luminance Degradation Rate after 5,000 hours (100 V, 60 Hz) |
|---|---|---|---|
| 12 | Phosphor of Sample 7 | 6758 | −0.95% |
| 13* | Phosphor of Sample 11 | 6600 | −14.6% |

*Sample 13 is a comparative example.

As is clear from the results of Table 3, the phosphor of the present invention has a low luminance degradation rate even when used in the fluorescent lamp.

INDUSTRIAL APPLICABILITY

According to the present invention described above, phosphor layers include a blue phosphor layer. This blue phosphor layer is formed of a compound expressed by $Ba_{1-x}MgAl_{10}O_{17}:Eu_X$ or $Ba_{1-x-y}Sr_yMgAl_{10}O_{17}:Eu_X$, and at least one element selected from Nb, Ta, Pr, P, As, Sb, Bi and Tm is substituted for a part of an Al or Mg element of this phosphor, so that degradations in various processes for the phosphor layer can be prevented. Consequently, a PDP or a fluorescent lamp can have improved luminance, life and reliability.

The invention claimed is:

1. A plasma display device comprising:
   a plasma display panel including discharge cells corresponding to colors, respectively, and phosphor layers of the colors, respectively, said phosphor layers being excitable by ultraviolet rays to emit light,
   wherein said phosphor layers include a blue phosphor layer formed of a compound expressed by one of $Ba_{1-x}MgAl_{10}O_{17}:Eu_x$ and $Ba_{1-x-y}Sr_yMgAl_{10}O_{17}:Eu_x$, with said compound including at least one of
   (i) a pentavalent ion of Nb,
   (ii) a pentavalent ion of Ta,
   (iii) a pentavalent ion of P,
   (iv) a pentavalent ion of As,
   (v) a pentavalent ion of Sb,
   (vi) a pentavalent ion of Bi,
   (vii) an ion of Pr, and
   (viii) an ion of Tm
   substituting for a part of one of Al and Mg, and with $0.03 \leq x \leq 0.2$ and $0.1 \leq y \leq 0.5$.

2. The plasma display device according to claim 1, wherein
   said at least one of
   (i) said pentavalent ion of Nb,
   (ii) said pentavalent ion of Ta,
   (iii) said pentavalent ion of P,
   (iv) said pentavalent ion of As,
   (v) said pentavalent ion of Sb, and
   (vi) said pentavalent ion of Bi
   is substituting for a part of said one of Al and Mg.

3. The plasma display device according to claim 2, wherein
   said at least one of
   (i) said pentavalent ion of Nb,
   (ii) said pentavalent ion of Ta,
   (iii) said pentavalent ion of P,
   (iv) said pentavalent ion of As,
   (v) said pentavalent ion of Sb, and
   (vi) said pentavalent ion of Bi
   is substituting for 0.01% to 3.00% of said one of Al and Mg.

4. The plasma display device according to claim 1, wherein
   said at least one of
   (i) said pentavalent ion of Nb,
   (ii) said pentavalent ion of Ta,
   (iii) said pentavalent ion of P,
   (iv) said pentavalent ion of As,
   (v) said pentavalent ion of Sb,
   (vi) said pentavalent ion of Bi,
   (vii) said ion of Pr, and
   (viii) said ion of Tm
   is substituting for 0.01% to 3.00% of said one of Al and Mg.

5. A blue phosphor that is excitable by ultraviolet rays so as to emit visible light, said blue phosphor having a crystal structure of one of $Ba_{1-x}MgAl_{10}O_{17}:Eu_x$ and $Ba_{1-x-y}Sr_yMgAl_{10}O_{17}:Eu_x$,
   wherein at least one of
   (i) a pentavalent ion of Nb,
   (ii) a pentavalent ion of Ta,
   (iii) a pentavalent ion of P,
   (iv) a pentavalent ion of As,
   (v) a pentavalent ion of Sb,
   (vi) a pentavalent ion of Bi,
   (vii) an ion of Pr, and
   (viii) an ion of Tm
   is substituting for a part of one of Al and Mg, and wherein $0.03 \leq x \leq 0.2$ and $0.1 \leq y \leq 0.5$.

6. The blue phosphor according to claim 5, wherein
   said at least one of
   (i) said pentavalent ion of Nb,
   (ii) said pentavalent ion of Ta,
   (iii) said pentavalent ion of P,
   (iv) said pentavalent ion of As,
   (v) said pentavalent ion of Sb, and
   (vi) said pentavalent ion of Bi
   is substituting for a part of said one of Al and Mg.

7. The blue phosphor according to claim 6, wherein
   said at least one of
   (i) said pentavalent ion of Nb,
   (ii) said pentavalent ion of Ta,
   (iii) said pentavalent ion of P,
   (iv) said pentavalent ion of As,
   (v) said pentavalent ion of Sb, and
   (vi) said pentavalent ion of Bi
   is substituting for 0.01% to 3.00% of said one of Al and Mg.

8. The blue phosphor according to claim 5, wherein
said at least one of
(i) said pentavalent ion of Nb,
(ii) said pentavalent ion of Ta,
(iii) said pentavalent ion of P,
(iv) said pentavalent ion of As,
(v) said pentavalent ion of Sb,
(vi) said pentavalent ion of Bi,
(vii) said ion of Pr, and
(viii) said ion of Tm
is substituting for 0.01% to 3.00% of said one of Al and Mg.

9. A method of manufacturing a phosphor having a crystal structure of one of $Ba_{1-x}MgAl_{10}O_{17}{:}Eu_x$ and $Ba_{1-x-y}Sr_yMgAl_{10}O_{17}{:}Eu_x$, with $0.03 \leqq x \leqq 0.2$ and $0.1 \leqq y \leqq 0.5$ comprising:
firing, as raw materials of blue phosphor, a mixture of $BaCO_3$, $MgCO_3$, $Al_2O_3$, $Eu_2O_3$ and $M_2O_5$, together with a flux, with M being one of
(i) a pentavalent ion of Nb,
(ii) a pentavalent ion of Ta,
(iii) a pentavalent ion of P,
(iv) a pentavalent ion of As,
(v) a pentavalent ion of Sb, and
(vi) a pentavalent ion of Bi,
so as to obtain a fired mixture;
crushing and sieving said fired mixture so as to obtain a crushed and sieved fired mixture;
firing said crushed and sieved fired mixture in a reducing atmosphere so as to obtain a product;
crushing and sieving said product so as to obtain a burnt product; and
firing said burnt product in an oxidizing atmosphere.

10. A method of manufacturing a phosphor having a crystal structure of one of $Ba_{1-x}MgAl_{10}O_{17}{:}Eu_x$ and $Ba_{1-x-y}Sr_yMgAl_{10}O_{17}{:}Eu_x$, with $0.03 \leqq x \leqq 0.2$ and $0.1 \leqq y \leqq 0.5$ comprising:
preparing a mixed solution by dissolving in an aqueous medium
(i) barium nitrate, magnesium nitrate, aluminum nitrate and europium nitrate as raw materials of a blue phosphor, and
(ii) one of a nitrate, chloride and organic compound including one of
(a) a pentavalent ion of Nb,
(b) a pentavalent ion of Ta,
(c) a pentavalent ion of P,
(d) a pentavalent ion of As,
(e) a pentavalent ion of Sb,
(f) a pentavalent ion of Bi,
(g) an ion of Pr, and
(h) an ion of Tm,
as a raw material for substituting for part of one of aluminum and magnesium;
in a corrosion-resistant and heat-resistant vessel, subjecting said mixed solution to a hydrothermal synthesis reaction at a temperature of from 100° C.–350° C. and under a pressure of from 0.2 MPa–25.0 Mpa, so as to obtain a blue phosphor product;
annealing said blue phosphor product at a temperature of from 1,350° C.–1,600° C. in a reducing atmosphere so as to obtain an annealed blue phosphor product; and
classifying said annealed blue phosphor product,
wherein said one of
(a) said pentavalent ion of Nb,
(b) said pentavalent ion of Ta,
(c) said pentavalent ion of P,
(d) said pentavalent ion of As,
(e) said pentavalent ion of Sb,
(f) said pentavalent ion of Bi,
(g) said ion of Pr, and
(h) said ion of Tm
substitutes for part of one of aluminum and magnesium.

11. The method according to claim 10, wherein
said one of
(a) said pentavalent ion of Nb,
(b) said pentavalent ion of Ta,
(c) said pentavalent ion of P,
(d) said pentavalent ion of As,
(e) said pentavalent ion of Sb,
(f) said pentavalent ion of Bi,
(g) said ion of Pr, and
(h) said ion of Tm
substitutes for 0.01% to 3.00% of said one of aluminum and magnesium.

12. The method according to claim 10, wherein
said one of a nitrate, chloride and organic compound includes one of
(a) said pentavalent ion of Nb,
(b) said pentavalent ion of Ta,
(c) said pentavalent ion of P,
(d) said pentavalent ion of As,
(e) said pentavalent ion of Sb, and
(f) said pentavalent ion of Bi.

13. The method according to claim 12, wherein
said one of
(a) said pentavalent ion of Nb,
(b) said pentavalent ion of Ta,
(c) said pentavalent ion of P,
(d) said pentavalent ion of As,
(e) said pentavalent ion of Sb, and
(f) said pentavalent ion of Bi
substitutes for 0.01% to 3.00% of said one of aluminum and magnesium.

14. The method according to claim 9, wherein
the method is for manufacturing a phosphor having the crystal structure of $Ba_{1-x}MgAl_{10}O_{17}{:}Eu_x$.

15. The method according to claim 10, wherein
the method is for manufacturing a phosphor having the crystal structure of $Ba_{1-x}MgAl_{10}O_{17}{:}Eu_x$.

16. The method according to claim 15, wherein
said one of
(a) said pentavalent ion of Nb,
(b) said pentavalent ion of Ta,
(c) said pentavalent ion of P,
(d) said pentavalent ion of As,
(e) said pentavalent ion of Sb,
(f) said pentavalent ion of Bi,
(g) said ion of Pr, and
(h) said ion of Tm
substitutes for 0.01% to 3.00% of said one of aluminum and magnesium.

17. The method according to claim 16, wherein
annealing said blue phosphor product at a temperature of from 1,350° C.–1,600° C. in an atmosphere including nitrogen and hydrogen comprises annealing said blue phosphor product at a temperature of from 1,350° C.–1,600° C. in an atmosphere including 95% nitrogen and 5% hydrogen.

18. The method according to claim 10, wherein
annealing said blue phosphor product at a temperature of from 1,350° C.–1,600° C. in an atmosphere including nitrogen and hydrogen comprises annealing said blue phosphor product at a temperature of from 1,350° C.–1,600° C. in an atmosphere including 95% nitrogen and 5% hydrogen.

* * * * *

UNITED STATES PATENT AND TRADEMARK OFFICE
CERTIFICATE OF CORRECTION

PATENT NO. : 7,208,102 B2
APPLICATION NO. : 10/485305
DATED : April 24, 2007
INVENTOR(S) : Masaki Aoki et al.

It is certified that error appears in the above-identified patent and that said Letters Patent is hereby corrected as shown below:

In claim 10, column 17, line 56, "100° C.-350° C." should read --100° C-350° C--.

In claim 10, column 17, line 60, "1,350° C.-1,600° C." should read --1,350° C-1,600° C--.

In claim 17, column 18, line 55, "1,350° C.-1,600° C." should read --1,350° C-1,600° C--.

In claim 17, column 18, lines 57-58, "1,350° C.-1,600° C." should read --1,350° C-1,600° C--.

In claim 18, column 18, line 62, "1,350° C.-1,600° C." should read --1,350° C-1,600° C--.

In claim 18, column 18, lines 64-65, "1,350° C.-1,600° C." should read --1,350° C-1,600° C--.

Signed and Sealed this

Sixth Day of May, 2008

JON W. DUDAS
*Director of the United States Patent and Trademark Office*